(12) United States Patent
Wu

(10) Patent No.: US 11,170,574 B2
(45) Date of Patent: Nov. 9, 2021

(54) METHOD AND APPARATUS FOR GENERATING A NAVIGATION GUIDE

(71) Applicant: Alibaba Group Holding Limited, Grand Cayman (KY)

(72) Inventor: Xiaodong Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/766,835

(22) PCT Filed: Dec. 10, 2018

(86) PCT No.: PCT/CN2018/120076
§ 371 (c)(1),
(2) Date: May 26, 2020

(87) PCT Pub. No.: WO2019/114653
PCT Pub. Date: Jun. 20, 2019

(65) Prior Publication Data
US 2020/0372711 A1  Nov. 26, 2020

(30) Foreign Application Priority Data
Dec. 15, 2017 (CN) .......................... 201711353151.5

(51) Int. Cl.
G06T 19/00 (2011.01)
G06T 19/20 (2011.01)
(52) U.S. Cl.
CPC .......... G06T 19/003 (2013.01); G06T 19/006 (2013.01); G06T 19/20 (2013.01)

(58) Field of Classification Search
CPC ..... G06T 19/006; G06T 19/003; G06T 19/20; G06T 7/38; G06T 17/00; G06T 19/00; G01C 21/00; G06K 9/00
See application file for complete search history.

(56) References Cited

U.S. PATENT DOCUMENTS 7,324,081 B2   1/2008  Friedrich et al.
7,817,104 B2   10/2010 Ryu et al.
(Continued)

FOREIGN PATENT DOCUMENTS

CN   105023266 A   11/2015
CN   106254848 A   12/2016
(Continued)

OTHER PUBLICATIONS

Radkowski, "Object Tracking with a Range Camera for Augmented Reality Assembly Assistance", 2016 (Year: 2016).*
(Continued)

*Primary Examiner* — Phong X Nguyen
(74) *Attorney, Agent, or Firm* — James J. DeCarlo; Greenberg Traurig, LLP

(57) ABSTRACT

Embodiments of the disclosure provide a method and an apparatus for generating a navigation guide. In one embodiment, the method comprises: obtaining a point cloud database corresponding to an object to be identified, the object having a respective product model; determining a target navigation position based on the point cloud database; obtaining data associated with a screenshot of the product model, the screenshot captured based on the target navigation position; and generating the navigation guide for the object to be identified based on the data associated with the screenshot.

20 Claims, 10 Drawing Sheets

(56) References Cited

U.S. PATENT DOCUMENTS

| | | | |
|---|---|---|---|
| 8,180,396 B2 | 5/2012 | Athsani et al. | |
| 9,599,825 B1* | 3/2017 | Mullins | G02B 27/017 |
| 9,854,328 B2 | 12/2017 | Venkitaraman et al. | |
| 9,886,162 B2 | 2/2018 | Berelejis et al. | |
| 9,990,028 B2 | 6/2018 | Basra | |
| 10,137,374 B2 | 11/2018 | Miller et al. | |
| 10,217,284 B2 | 2/2019 | Das et al. | |
| 10,282,856 B2* | 5/2019 | Klingner | G06T 7/50 |
| 10,380,410 B2* | 8/2019 | Gold | G06K 9/00671 |
| 2009/0088830 A1* | 4/2009 | Mohamed | A61F 2/91 |
| | | | 623/1.11 |
| 2011/0173576 A1 | 7/2011 | Murphy et al. | |
| 2011/0217962 A1 | 9/2011 | Leung | |
| 2011/0279697 A1 | 11/2011 | Shingu et al. | |
| 2012/0019557 A1 | 1/2012 | Aronsson et al. | |
| 2012/0026191 A1 | 2/2012 | Aronsson et al. | |
| 2012/0038781 A1 | 2/2012 | Im et al. | |
| 2015/0084951 A1* | 3/2015 | Boivin | G06F 3/017 |
| | | | 345/419 |
| 2015/0206349 A1 | 7/2015 | Rosenthal et al. | |
| 2016/0055671 A1* | 2/2016 | Menozzi | G01S 5/16 |
| | | | 701/300 |
| 2016/0358383 A1* | 12/2016 | Gauglitz | G06T 19/006 |
| 2017/0017301 A1* | 1/2017 | Doornenbal | G06F 3/005 |
| 2017/0071673 A1* | 3/2017 | Ferro | A61B 5/0077 |
| 2017/0103574 A1 | 4/2017 | Faaborg et al. | |
| 2017/0236024 A1* | 8/2017 | Wang | G06K 9/6221 |
| | | | 382/201 |
| 2017/0312032 A1* | 11/2017 | Amanatullah | G09B 23/30 |
| 2017/0332069 A1* | 11/2017 | Hillebrand | H04N 13/243 |
| 2018/0038699 A1* | 2/2018 | Ikeda | G09G 3/20 |
| 2018/0082475 A1* | 3/2018 | Sharma | G06F 3/147 |
| 2018/0101989 A1* | 4/2018 | Frueh | G06K 9/00255 |
| 2018/0103209 A1* | 4/2018 | Fischler | G06T 7/55 |
| 2018/0190017 A1* | 7/2018 | Mendez | G06T 17/00 |
| 2020/0401803 A1* | 12/2020 | Gilbert | G06K 9/00671 |

FOREIGN PATENT DOCUMENTS

| | | |
|---|---|---|
| CN | 106355647 A | 1/2017 |
| TW | 201727514 A | 8/2017 |

OTHER PUBLICATIONS

Kelby, "Fixing Chromatic Aberrations (That Colored-Edge Fringe)", 2009, available at https://www.peachpit.com/articles/article.aspx?p=1317820&seqNum=4 (Year: 2009).*

Barone et al., Three-dimensional point cloud alignment detecting fiducial markers by structured light stereo imaging, 2012 (Year: 2012).*

Gauglitz et al., World-Stabilized Annotations and Virtual Scene Navigation for Remote Collaboration, 2014 (Year: 2014).*

Gupta et al., DuploTrack: A Real-time System for Authoring and Guiding Duplo Block Assembly, 2012 (Year: 2012).*

Sukan et al., Quick Viewpoint Switching for Manipulating Virtual Objects in Hand-Held Augmented Reality using Stored Snapshots, 2012 (Year: 2012).*

International Search Report to corresponding International Application No. PCT/CN2018/120076 dated Mar. 13, 2019 (2 pages).

Supplementary European Search Report to corresponding EP Application No. 18888051 dated Aug. 6, 2021 (10 pages).

* cited by examiner

METHOD AND APPARATUS FOR GENERATING A NAVIGATION GUIDE

CROSS-REFERENCE TO RELATED APPLICATIONS

The present application is a national stage entry of Int'l Appl. No. PCT/CN2018/120076, filed on Dec. 10, 2018, which claims priority to Chinese Patent Application No. 201711353151.5, filed on Dec. 15, 2017, both of which are incorporated herein by reference in their entirety.

BACKGROUND

Technical Field

The disclosure relates to the technical field of Augmented Reality (AR), and in particular, to methods and apparatuses for generating a navigation guide.

Description of Related Art

AR is a technology for computing the positions and angles of images captured by an imaging device (e.g., a camera) in real-time and augmenting with corresponding images, videos, three-dimensional (3D) models, and the like. One application of the technology is to superimpose a virtual object onto a real-world object on a screen for interactions. With the improvement of the computing power of processors of portable and wearable electronic products, the application of AR technology is expected to encompass a wider variety of fields.

Presently, when using an AR application, a guide is required for the off-line scan of real-world objects such that to guide a user to capture images of the real-world object with a camera aligned thereto. However, during point cloud recording, typically, a guide is generated based on an initialization angle. If the angle at which the camera used by the user for imaging the real-world object differs from the initialization angle, manual intervention is required to modify the guide, which entails a large amount of manual labor and leads to slow modifications.

SUMMARY

Embodiments of the disclosure provide improved methods and apparatuses for generating a navigation guide to address the above-described problems.

In one embodiment, the disclosure provides a method for generating a navigation guide, the method comprising: obtaining a point cloud database corresponding to an object to be identified, the object having a respective product model; determining a target navigation position based on the point cloud database; obtaining data associated with a screenshot of the product model, the screenshot captured based on the target navigation position; and generating the navigation guide for the object based on the data associated with the screenshot.

In one embodiment, the determining the target navigation position of the object to be identified based on the point cloud database comprises: obtaining an initialization angle from the point cloud database; and designating the initialization angle as the target navigation position for a camera of a mobile device.

In one embodiment, the obtaining the data associated with the screenshot of the product model which is captured based on the target navigation position, comprises: adjusting the product model of the object to be identified based on the target navigation position; and obtaining the data associated with the screenshot of the adjusted product model.

In one embodiment, the generating the navigation guide for the object to be identified based on the data associated with the screenshot comprises: extracting edge data from the data associated with the screenshot; adjusting one or more of edge color and background color of the data associated with the screenshot based on the edge data; extracting a profile diagram of the object to be identified based on the adjusted data associated with the screenshot; and designating the profile diagram as the navigation guide for the object to be identified.

In one embodiment, after extracting the edge data from the data associated with the screenshot, the method further comprises performing one or more of frequency filtering and color correction on the edge data.

In one embodiment, after the generating the navigation guide for the object to be identified based on the data associated with the screenshot, the method further comprises: loading a pre-configured service page when activating an AR application, the service page comprising the navigation guide for the object to be identified; and controlling the movement of a camera to scan the object to be identified to obtain video data.

In one embodiment, after the controlling the movement of the camera to scan the object to be identified to obtain the video data, the method further comprises: obtaining content material data from a content material library upon a user aligns the camera onto the object to be identified based on the navigation guide; matching imagery data in the video data with the point cloud database to obtain a three-dimensional matrix; and interacting the content material data and the imagery data in relation to the product model based on the three-dimensional matrix to present the object to be identified to the user, wherein the content material data comprises one or more of: animation data, textural data, and other annotation data.

In one embodiment, the disclosure provides a method for generating a point cloud database, the method comprising: obtaining a product model of an object to be identified; recording the product model in with an initialization angle to obtain the point cloud data associated with the initialization angle; recording the product model with a plurality of recording angles to obtain the point cloud data associated with the plurality of recording angles; and storing, the initialization angle, the point cloud data associated with the initialization angle, as well as the plurality of recording angles and the point cloud data associated with the plurality of recording angles in the point cloud database.

In one embodiment, the disclosure provides an apparatus for generating a navigation guide, the apparatus comprising: a point cloud database obtaining module configured for obtaining a point cloud database corresponding to an object to be identified, the object having a respective product model; a target navigation position determination module configured for determining a target navigation position based on the point cloud database; a screenshot data obtaining module configured for obtaining data associated with a screenshot of the product model, the screenshot captured based on the target navigation position; and a navigation guide generation module configured for generating the navigation guide for the object to be identified based on the data associated with the screenshot.

In one embodiment, the target navigation position determination module comprises: an initialization angle acquisition sub-module configured for obtaining an initialization angle from the point cloud database; and a target navigation position designating sub-module configured for designating the initialization angle as the target navigation position for a camera of a mobile device.

In one embodiment, the screenshot data obtaining module comprises: a product model adjustment sub-module configured for adjusting the product model of the object to be identified based on the target navigation position; and a screenshot data obtaining sub-module configured for obtaining the data associated with the screenshot of the adjusted product model.

In one embodiment, the navigation guide generation module comprises: an edge data extraction sub-module configured for extracting edge data from the data associated with the screenshot; a screenshot data adjustment sub-module configured for adjusting one or more of edge color and background color of the data associated with the screenshot based on the edge data; a profile extraction sub-module configured for extracting a profile diagram of the object to be identified based on the adjusted data associated with the screenshot; and a navigation guide designating sub-module configured for designating the profile diagram as the navigation guide for the object to be identified.

In one embodiment, the apparatus further comprises: a data processing sub-module configured for performing one or more of frequency filtering and color correction on the edge data.

In one embodiment, the apparatus further comprises: a service page loading module configured for loading a pre-configured service page when activating an AR application, the service page comprising the navigation guide for the object to be identified; and a video data acquisition module configured for controlling the movement of the camera to scan the object to be identified to obtain video data.

In one embodiment, the video data comprises imagery data, and the apparatus further comprises: a content material data obtaining module configured for obtaining content material data from a content material library when a user aligns the camera onto the object to be identified based on the navigation guide; a three-dimensional matrix acquisition module for matching the imagery data in the video data with the point cloud database to obtain a three-dimensional matrix; and an object presentation module for interacting the content material data and the imagery data to the product model based on the three-dimensional matrix to present the object to be identified to the user, wherein the content material data comprises one or more of: animation data, textural data, and other annotation data.

In one embodiment, the disclosure provides an apparatus for generating a point cloud database, the method comprising: a product model obtaining module for obtaining a product model for an object to be identified; a first point cloud data acquisition module for recording the product model at an initialization angle to obtain point cloud data associated with the initialization angle; a second point cloud data acquisition module for recording the product model at a plurality of recording angles to obtain point cloud data associated with the plurality of recording angles; and a point cloud data storing module for storing, into the point cloud database, the initialization angle and the point cloud data associated with the initialization angle, as well as the plurality of recording angles and the point cloud data associated with the plurality of recording angles.

In one embodiment, the disclosure provides an apparatus, the apparatus comprising: one or more processors; and one or more computer-readable media having instructions stored thereon, when executed by the one or more processors, instructing the apparatus to perform the methods as described above.

In one embodiment, the disclosure provides one or more computer-readable media having instructions stored thereon, when executed by one or more processors, instructing an apparatus to perform the methods as described above.

Embodiments of the disclosure have the following advantages.

Embodiments of the disclosure provide a method for generating a navigation guide provides. Specifically, when an AR application is activated, a point cloud database pre-configured for the object to be identified is obtained. An initial target navigation position is determined based on the point cloud database. The data associated with a screenshot of the product model is obtained based on the target navigation position. Subsequently, a navigation guide for guiding a user to align the camera onto the object to be identified is generated based on the data associated with the screenshot. As a result, the navigation guide is generated quickly based on the point cloud database, and thereby the user can rely on the navigation guide to more accurately scan the object to be identified to then has such an object presented in an AR system. As such, the improved process does not involve manual modification of the guide, entailing no manual labor required and yet high the processing speed.

DETAILED DESCRIPTION

To facilitate a full understanding of the above-mentioned objectives, features, and advantages provided by the disclosure, many specific details are set forth below to describe the disclosure in combination with the accompanying figures, some exemplary specific embodiments and implementations.

Figure 1:
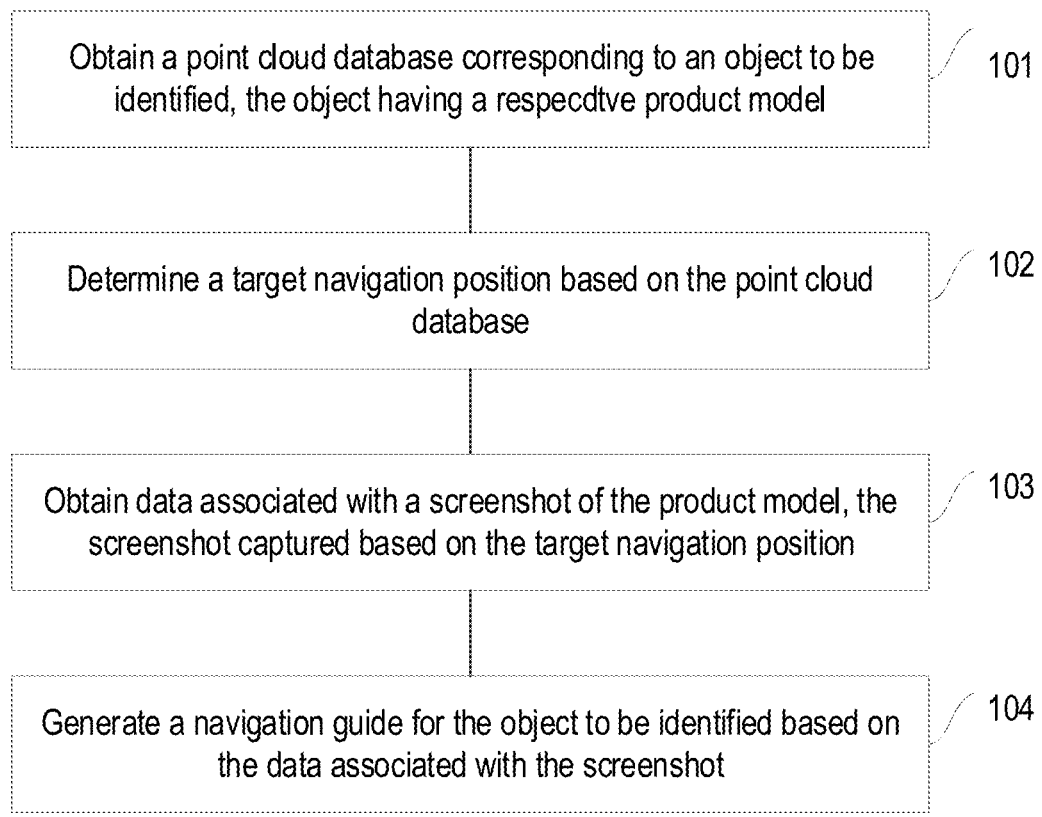
FIG. 1 is a flow diagram illustrating a method for generating a navigation guide according to some embodiments of the disclosure.

FIG. 1 is a flow diagram illustrating a method for generating a navigation guide according to an embodiment of the disclosure. As shown in FIG. 1, the method for generating a navigation guide includes the following steps.

Step 101: obtain a point cloud database corresponding to an object to be identified, the object having a respective product model.

In some embodiments, the point cloud database is recorded in advance for the object to be identified; and the respective product model is also designed in advance for presenting the object to be identified. In one embodiment, the product model is made by a designer. In other embodiments, the product model is obtained by scanning using a 3D scanning device.

Step 102: determine a target navigation position based on the point cloud database.

According to various embodiments, the navigation guide is generated at a faster speed using the point cloud database such that a user can align to a target navigation position faster to display the object to be identified.

In some embodiments, a mobile device equipped with a camera is configured to perform the method. The point cloud database is recorded based on an initialization angle. In this case, the determining the target navigation position of the object to be identified based on the point cloud database includes: obtaining the initialization angle from the point cloud database; and designating the initialization angle as the target navigation position for the camera of the mobile device.

Embodiments of the disclosure are applicable to various mobile devices, including but not limited to mobile phones, tablet computers, notebook computers, palmtop computers, in-vehicle terminals, wearable devices, and any other devices equipped with cameras or otherwise capable of capturing images.

As used herein, the object to be identified refers to a real-world object, at which a camera of a mobile device aligns. A real-world object may include, for example, a water purifier, a dishwasher, and other smart appliances. In some scenarios, when activating an AR application, the user turns on the camera, and the camera starts to scan the object to be identified to obtain video data. In other scenarios, the AR application is activated by the user after the camera is turned on.

In some embodiments, the point cloud database is recorded by aligning with the object to be identified based on a configured initialization angle to obtain the corresponding point cloud data. Additionally, the object to be identified is further recorded in a rotational manner at the initialization angle to obtain the point cloud data captured at different angles. In some embodiments, the initialization angle is obtained from the point cloud database and used as the target navigation position for the camera.

Step 103: obtain the data associated with a screenshot of the product model, the screenshot captured based on the target navigation position.

In implementations, the product model is a 3D model. In some embodiments, data associated with a 2D screenshot of the 3D model is obtained. The data associated with the screenshot has no other interfering parts/objects except for those associated with the model.

In some embodiments, step 103 includes the following sub-steps.

Sub-step S11: adjust the product model of the object to be identified based on the target navigation position.

Sub-step S12: obtain the data associated with the screenshot of the adjusted product model.

In some embodiments, the initialization angle is obtained from the point cloud database, based on which the product model is adjusted such that the position/orientation of the model is in a direction consistent with the one recorded in the point cloud database. Subsequently, a screenshot for the product model is obtained in this direction, and the data associated with the screenshot is also obtained. This way, the product model is well-matched with the object according to a navigation instruction, after the object is identified in an AR environment.

As used herein, object identification in an AR environment refers to the techniques that compute the position and orientation of an object in real-time, and align the virtual objects in interactions with real-world objects in a later stage. In some implementations, the use of these techniques achieves the later-stage interactions between the object to be identified and the product model such that the product model is adjustably c aligned in relation to the object to be identified (e.g., the overlay is adjustably kept) even through movements of the camera.

Step 104: generate the navigation guide for the object based on the data associated with the screenshot.

In some embodiments, the navigation guide is used to guide the user to adjust the camera to a position that is expected of the user to place the camera, which may be an angle recorded in the point cloud database.

In one embodiment, step 104 includes the following sub-steps.

Sub-step S21: extract edge data from the data associated with the screenshot.

Sub-step S22: adjust the edge color and the background color of the data associated with the screenshot based on the edge data.

Sub-step S23: extract a profile diagram for the object to be identified based on the adjusted data associated with the screenshot.

Sub-step S24: designate the profile diagram as the navigation guide for the object to be identified.

Figure 2:
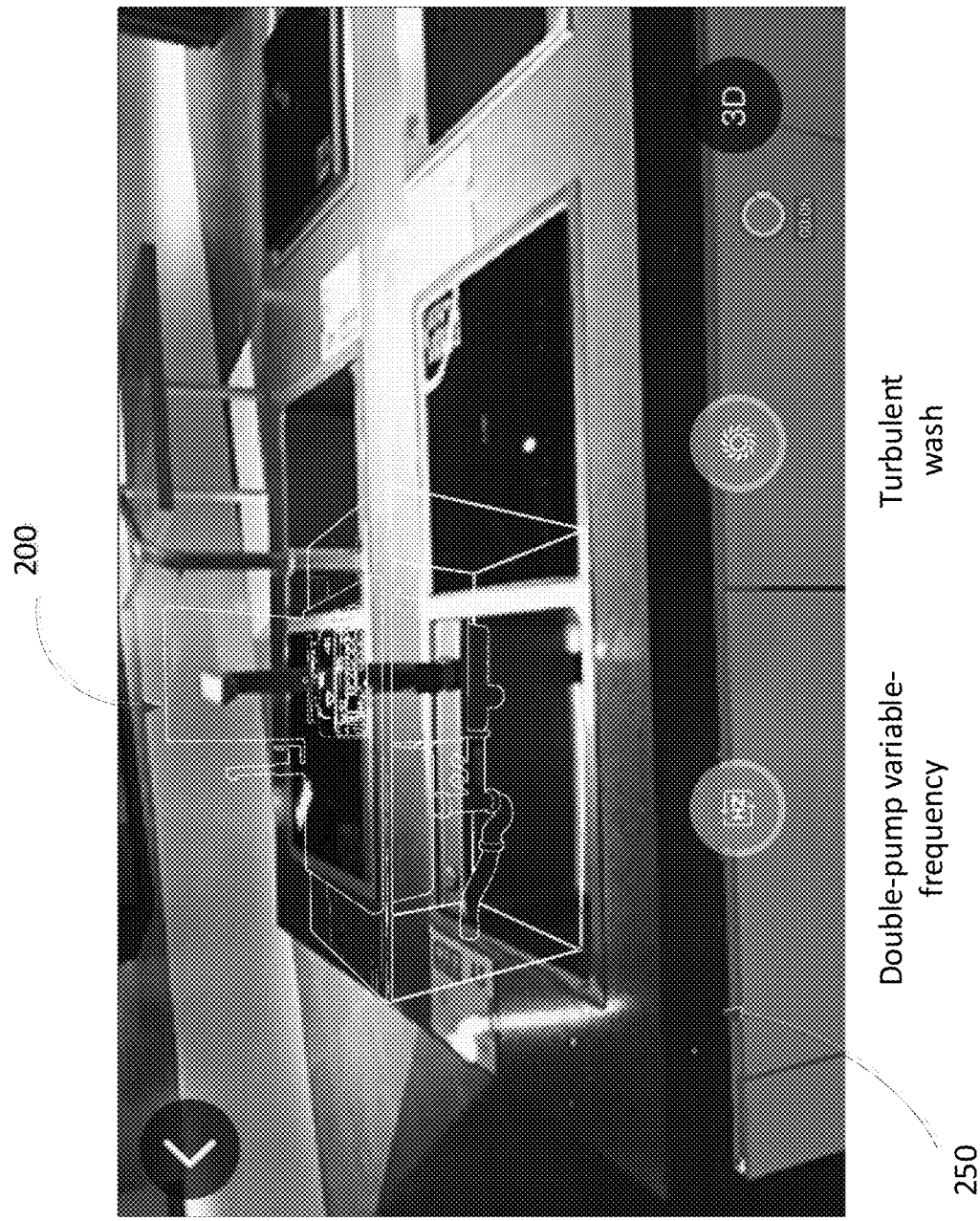
FIG. 2 is a schematic diagram illustrating a navigation guide according to some embodiments of the disclosure.

In some embodiments, after obtaining the data associated with the screenshot, an edge detection algorithm (e.g., Sobel algorithm) is applied for extracting the edge data (e.g., edges in the image) from the data associated with the screenshot. In one example, after being obtained, the data associated with the screenshot is directly input to a Sobel operator to extract the edge data. Based on the extracted edge data, one or more of the edge color and the background of the data associated with the screenshot are specified to generate a profile diagram having corresponding dimensions. The relatively sized profile diagram is designated as a navigation guide. As shown in FIG. 2, an example of a navigation guide 200, is illustrated in the context of a real-world object 250.

The edge data obtained using the Sobel algorithm captures the most basic feature of an image, and therefore plays an important role in applications such as computer vision, image processing, and the like. Further, the edge information in the image has useful information for content recognition, providing the main mechanism for feature extraction in image processing and pattern recognition.

In one implementation, a size of an image is specified using functionalities (e.g., the Canvas API defined by HTML standards) provided by, for example, a front-end application (e.g., a web browser). In one example, with a specified value of a width and a specified value of a height, the function of Canvas.toDataUrl( ) is invoked to obtain an image of the specified width and height. The following illustrates a process (e.g., pseudo-code) for generating an image of specified dimensions using the Canvas APIs.

1) extract information via sobelData.push (255, 255, 255, 255), from color data, in pixels;

2) render such arrays of the pixel information using the Canvas element of the browser:

var context=canvas.getContext('2d');
    var imageData=context.createImageData(width, height);
    imageData.data.set(data);//assigning the pixel information to a data array 3) the above-described width and height of the canvas are specified.

4) the image is generated directly via a call of canvas.toDataUrl( ).

The above-described way to obtain the corresponding image size is merely illustrative and not limiting. Other suitable techniques to generate images of specified dimensions are applicable herein without limitation.

In some embodiments, after sub-step S21, step 104 further includes the following steps.

Sub-step S25: perform one or both of frequency filtering and color correction on the edge data.

In one embodiment, with frequency filtering and/or color correction performed on the extracted edge data, a white-colored wireframe or a wireframe in other colors is generated. In implementations, for the frequency constraints (e.g., the cutoff frequency) applied, the higher the frequency is, the more schematic the wireframe is. Conversely, the lower the frequency is, the more detailed the wireframe is, including more noise data. In one example, it is accomplished by adding pure color texture to a 3D model while highlighting the edge thickness.

In one example, the application of frequency filtering and color correction to the edge data only requires a conditional decision, the pseudo-code of which is illustrated below.

```
var magnitude = Math.sqrt((pixelX * pixelX) + (pixelY * pixelY));
    if(magnitude * 3 > 200){
       sobelData.push(255, 255, 255, 255);
    }
    else{
    sobelData.push(magnitude, magnitude, magnitude, 0);
    }
```

Here, pixelX and pixelY represent images subjected to lateral and longitudinal edge detection, respectively. Magnitude represents a G gradient, and 200 is a threshold value. The larger the threshold value is, the coarser the filtering is, and the more noise points are. On the contrary, with a smaller threshold value, there are fewer noise points. 255, 255, 255, 255, alpha represent a color space of red, green, blue and alpha value (e.g., transparency), respectively. The set of values [255, 255, 255, 255] represents a color of white opaque, e.g., the desired white-colored wireframe.

The array pushed by sobelData.push (255, 255, 255, 255) is a color mixer, the elements of which respectively represents red, green, blue and transparency. As such, a wireframe of the desired color is obtained via specifying the corresponding values.

Figure 3A:
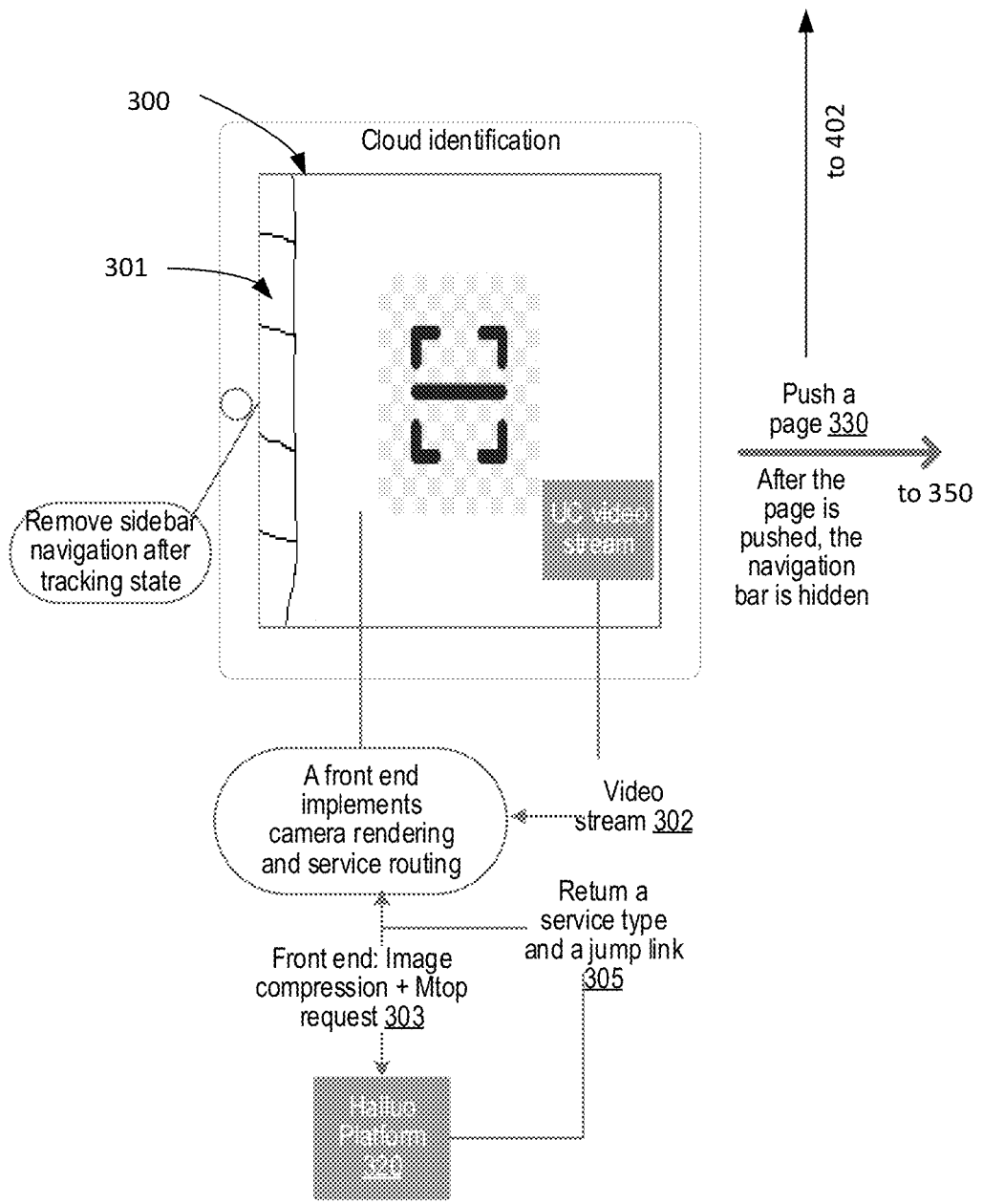
FIGS. 3A-3B are flow diagrams illustrating a process for activating an AR navigation according to some embodiments of the disclosure.
Figure 3B:
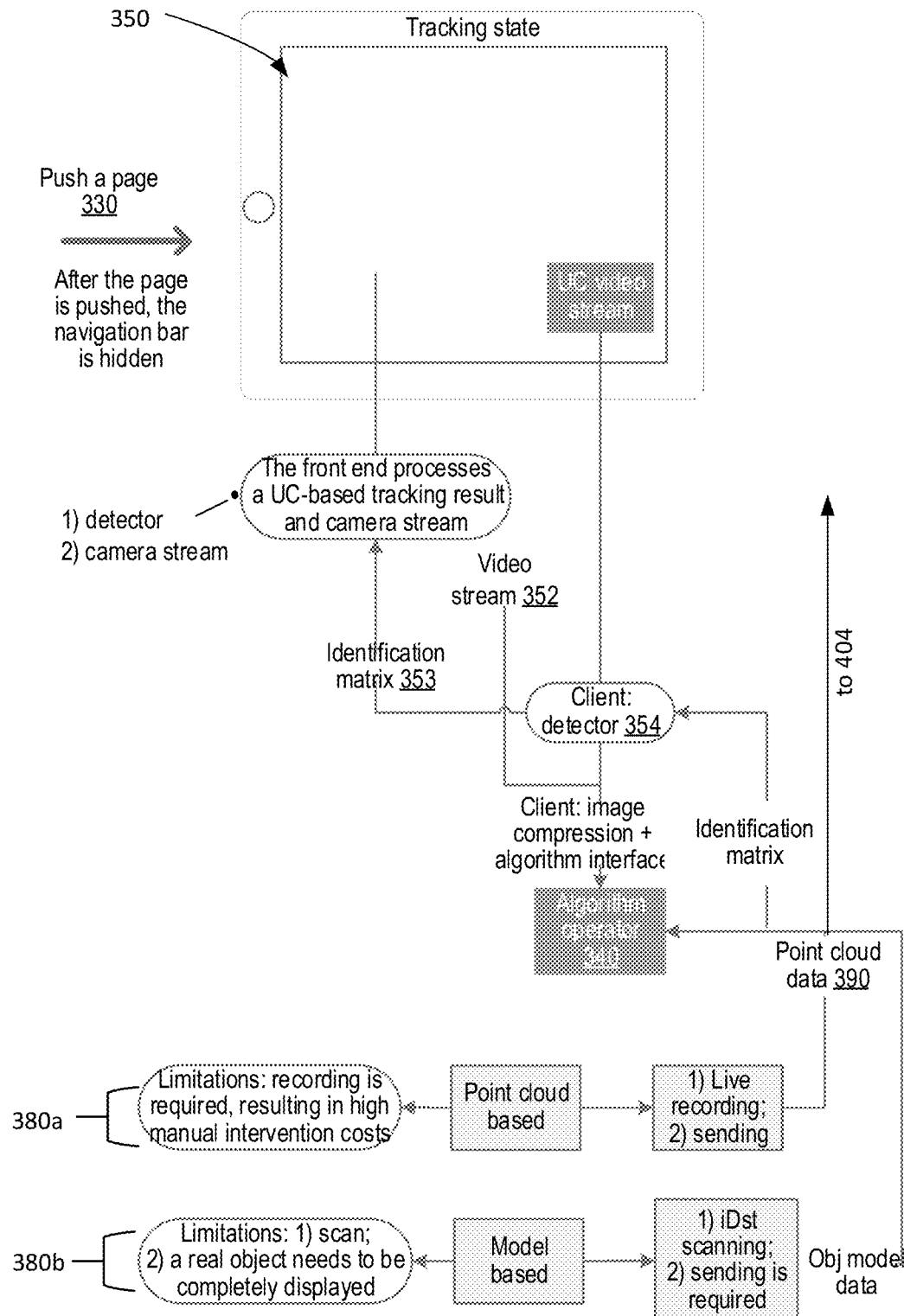

FIGS. 3A-3B are flow diagrams illustrating a process for activating an AR navigation according to an embodiment of the disclosure. As shown herein FIG. 3A, an AR application on a front-end of a mobile device (e.g., client device) is configured to start in a client identification mode 300. In this example, the front-end of the mobile device is configured to implement camera rendering and service routing. An Hailuo Platform 320 is configured to include an AR content material library. When the AR application is activated, the camera of the client device is configured to acquire a video stream 302 (e.g., a video stream via a UC Browser) that includes frames of imagery data. A navigation bar 301 is displayed on the left-hand side of the front end as well. Subsequently, the front-end is configured to send, to the Hailuo Platform 320, an Mtop service request 303, which includes the imagery data captured by the camera of the mobile device. In response, the Hailuo Platform 320 is configured to return to the mobile device a page 305 including a jump link (e.g., anchor link), the clicking upon which navigates the user to a page that includes access to the activated camera, and a product model. The front-end device is configured to render the video stream acquired by the camera, and then send the rendered results to a display (e.g., screen) of the mobile device for displaying.

As shown herein, once the user clicks on the jump link and navigates to the pushed page along path 330, the AR application continues into a tracking mode, as illustrated in FIG. 3B, in which the navigation bar 301 is no longer displayed. As shown herein FIG. 3B, the AR application on a front-end of a mobile device (e.g., client device) is configured to, upon navigating to the pushed page, continue into a tracking mode 350. In this mode, the front-end of the mobile device is configured to, in addition to the aforedescribed camera rendering and service routing, The front end can perform processing based on the video stream 352 and a tracking result (e.g., a three-dimensional matrix 353) in addition to camera rendering and service routing. In this example, The point cloud data 390 and the video stream 352 (e.g., via a client detector 354) are sent to an algorithm operator 340 to obtain a processed video stream. The processed video stream is sent to the front end to achieve the superposition alignment (e.g., superimpose) between the real-world object and the virtual object, with based on the tracking result, and finally. Next, the processed video stream is sent to the screen of the terminal mobile device for displaying to be played.

Along paths of 380a and 380b, respectively, FIG. 3B also illustrates two examples of the generation of model information for input to, for example, e algorithm operator 340. Along the path 380a, via live recording and sending, point cloud technique is used to generate point cloud data as the model information. With this example, the limitation is that live recording is required, and the cost of manual intervention is high. Along the path 380b, via iDist scanning and required sending, models are used to generate object model data as the model information. With this example, the limitation is that scanning is required, and a real-world object needs to be completed displayed.

Figure 4:
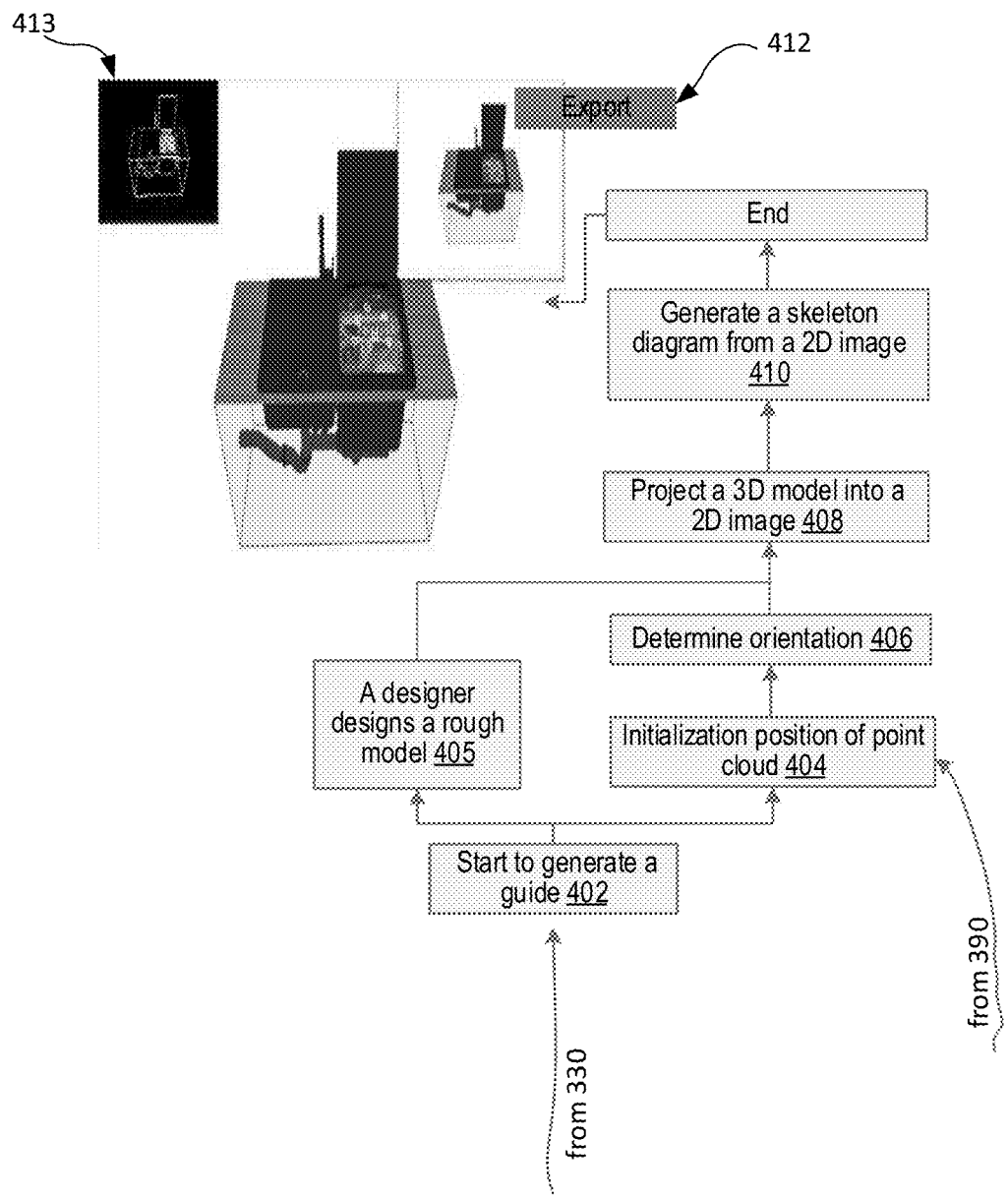
FIG. 4 is a flow diagram illustrating a process for generating a navigation guide according to some embodiments of the disclosure.

FIG. 4 is a flow diagram illustrating a process for generating a navigation guide according to an embodiment of the disclosure. As shown herein, at 402, the process starts to generate the navigation guide. A product model designed by a designer is first obtained at 405; the initialization position (e.g., angle) associated with the point cloud is obtained from the point cloud database at 404, and the product model is adjusted based on an initialization angle recorded in a point cloud database. Next, after the product model is adjusted, a screenshot 412 converting the product model from 3D format to 2D format is obtained to generate the data associated therewith at 408. A profile diagram 413 is obtained based on the data associated with the screenshot and designated as a navigation guide at 410. Using the navigation guide, a user is guided to change the orientation of a camera for scanning an object to be identified to an angle/orientation stored in the point cloud database.

In one embodiment, after the generating the navigation guide for the object to be identified based on the data associated with the screenshot, the process further includes: loading a pre-configured service page when activating an AR application, where the service page includes the navigation guide for the object to be identified; and controlling the camera movement to scan the object to be identified to obtain video data.

In some embodiments, a pre-configured service page is loaded upon the AR application being activated. The service page is configured to include the navigation guide for the object to be identified so as to guide the user to reposition the camera's pose (e.g., position, orientation) to a target navigation position/pose. Meanwhile, the camera is also controlled to scan the object to be identified, and video data of the object to be identified captured by the camera is received at the AR application.

In one embodiment, the video data includes imagery data. After generating the navigation guide for the object to be identified based on the data associated with the screenshot and the initialization angle obtained from the cloud point database, (e.g., at step 104 of FIG. 1), the process further includes: obtaining AR content material data from a content material library when a user aligns the camera onto the object to be identified based on the navigation guide; matching the imagery data in the video data with the point cloud database to obtain a three-dimensional matrix; and interacting the content material data and the imagery data in relation to the product model, based on the three-dimensional matrix, to present the object to be identified to the user. In some examples, the content material data includes one or more of: animation data, textural data, and/or other annotation data.

According to various embodiments, once the navigation guide is generated, the user can be prompted to align the camera onto the object to be identified based on the navigation guide. This way, the angle used by the user for aligning the camera onto the object is the same as the initialization angle recorded in the point cloud database in association with the product model.

Once the camera is well aligned onto the object to be identified, the user obtains content materials from a content material library, such as an animation, texture, and other annotation data. These content materials are in turn used for presenting the object to be identified to the user.

In order to achieve better relative alignment (e.g., superimpose) between the virtual object and the real-world object, when the user activates the AR application to scan the object to be identified, a point cloud database is retrieved. Using suitable algorithms, the data in the point cloud database is matched against the imagery data obtained by a lens (e.g., of the camera) for the object, frame by frame, so that two variables (a projection matrix and a view matrix), e.g., a three-dimensional matrix, is generated upon a successful match.

Figure 5:
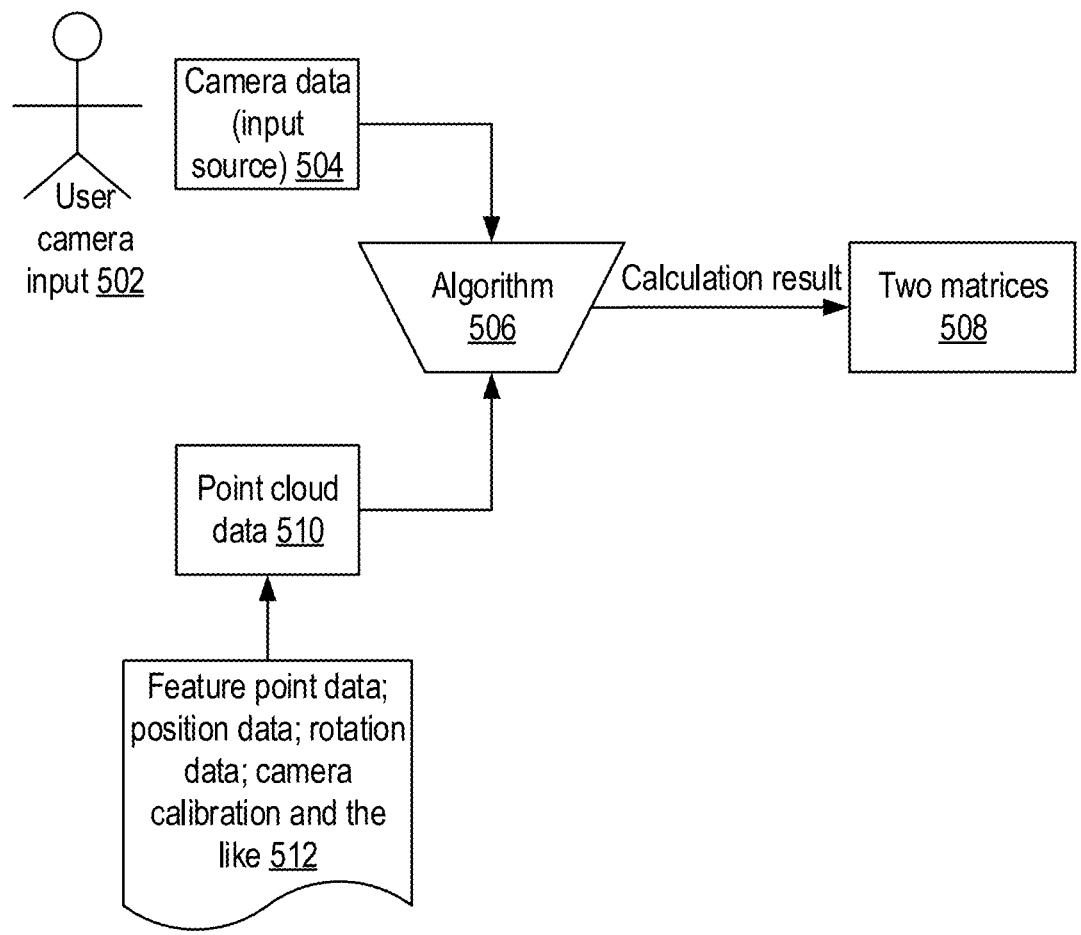
FIG. 5 is a flow diagram illustrating a process for computing three-dimensional matrixes according to some embodiments of the disclosure.

FIG. 5 is a flow diagram illustrating a process for computing 3D matrixes according to an embodiment of the present disclosure. As shown herein, the user's camera is configured to obtain camera input at 502, after which camera data (e.g., input source) 504 is transmitted to an algorithm operator 506 for processing. On the other hand, data 512, including feature point data, position data, ration data, camera calibration data and the like is used to generated points cloud data 510 (the details of which is described in connection with FIG. 6 below). The point cloud data 510 is also transmitted to the algorithm operator 506, which is configured to generate the two above-described matrixes 508.

As such, to improve the degree of accuracy when superimposing the virtual object in relation to the real-world object, the information corresponding to the projection matrix and the view matrix that are identified and extracted by the algorithm operator is applied to the virtual object. Any other suitable technique can also be used herein for implementation, without limitation.

According to various embodiments of the disclosure, when an AR application is activated, a point cloud database pre-configured for the object to be identified in advance is obtained. An initial target navigation position is determined based on the point cloud database. Based on the target navigation position, data associated with a screenshot of the product model is obtained. Subsequently, a navigation guide for guiding a user to align a camera onto the object to be identified is generated based on the data associated with the screenshot. As a result, the navigation guide is generated quickly using the point cloud database, thereby the user can reply to the navigation guide to more accurately scan the object to be identified speed and then to present such an object. This way, the improved process does not involve manual modification of the navigation guide, entailing no manual labor required and yet high processing speed.

Figure 6:
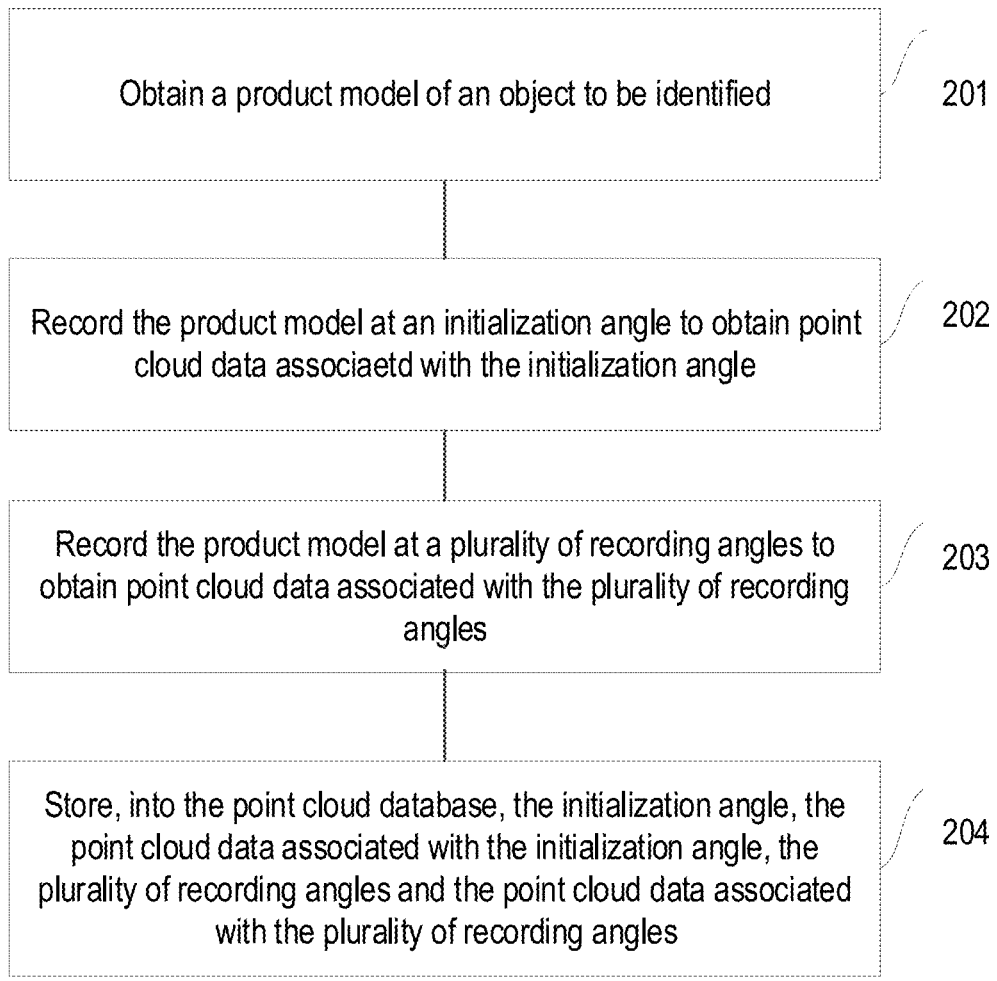
FIG. 6 is a flow diagram illustrating a method for generating a point cloud database according to some embodiments of the disclosure.

FIG. 6 is a flow diagram illustrating a method for generating a point cloud database according to an embodiment of the disclosure. As shown herein, the method includes the following steps.

Step 201: obtain a product model associated with an object to be identified.

Step 202: record the product model at an initialization angle to obtain point cloud data corresponding to the initialization angle.

Step 203: record the product model at a plurality of recording angles to obtain point cloud data corresponding to the plurality of recording angles.

Step 204: store the initialization angle and the point cloud data corresponding to the initialization angle, as well as the plurality of recording angles and the point cloud data corresponding to the plurality of recording angles into a point cloud database.

In one example, an algorithm engineer aligns a camera at the object to be identified at a certain angle (e.g., the initialization angle) during initialization. At this point, the point cloud data associated with the feature points of the object to be identified and the initialization angle are both recorded. Then the algorithm engineer rotates the camera around the object to be identified to record the point cloud data associated with the feature points of the object at different angles. In some implementations, the point cloud data includes data such as three-dimensional edge information and shape information.

After the point cloud data is recorded, a compressed package (e.g., the point cloud database) is generated. In some embodiments, the cloud point database includes the above-described initialization angle and recording angles, as well as their respective point cloud data, A projection matrix and a view matrix are extracted from the point cloud data using a recognition algorithm. The two matrices are the two important variables for properly aligning the virtual object in relation to the real-world object.

When the user subsequently activates an AR application and turns on the camera to scan the object to be identified, the compressed package is retrieved and matched against the object (to be identified) that is captured by the camera. The matching results include: whether the scanned object is identified; and/or identifying a three-dimensional matrix (e.g., including the projection matrix and the view matrix) for the object. The matrix is used to restore the position of the object in the screen of an AR system so that the virtual object is accurately aligned in relation to the real-world object.

It should be noted that embodiments are described herein as a combination of a series of actions for simplicity of illustration. Those skilled in the art can recognize that the embodiments of the disclosure are not limited by the described order of actions as some steps may, in accordance with the embodiments of the disclosure, be carried out in other orders or simultaneously. Further, those skilled in the art should also appreciate that the embodiments described herein are exemplary, and that some of the described actions are not necessarily required of embodiments of the disclosure.

Figure 7:
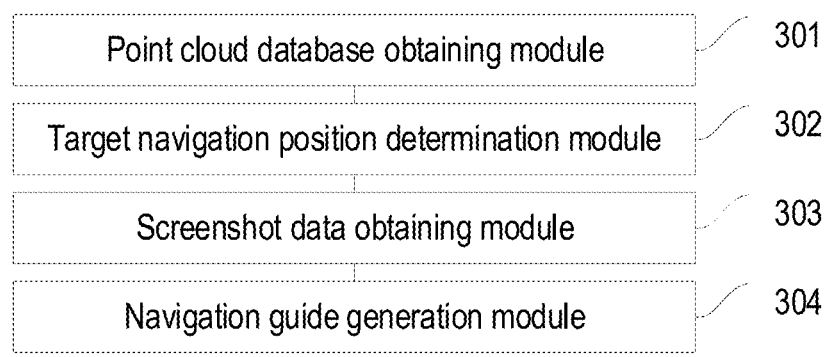
FIG. 7 is a block diagram illustrating an apparatus for generating a navigation guide according to some embodiments of the disclosure.

FIG. 7 is block diagram illustrating an apparatus for generating a navigation guide according to an embodiment of the disclosure. As shown in FIG. 7, the apparatus includes a point cloud database obtaining module (301), a target navigation position determination module (302), a screenshot data obtaining module (303), and a navigation guide generation module (304).

The point cloud database obtaining module (301) is configured for obtaining a point cloud database corresponding to an object to be identified, the object having a respective product model.

The target navigation position determination module (302) is configured for determining a target navigation position based on the point cloud database.

The screenshot data obtaining module (303) is configured for obtaining data associated with a screenshot of the product model, the screenshot captured based on the target navigation position.

The navigation guide generation module (304) is configured for generating the navigation guide for the object to be identified based on the data associated with the screenshot.

In some embodiments, the apparatus is included at a mobile device with a camera. The point cloud database is recorded based on an initialization angle. The target navigation position determination module (302) includes an initialization angle acquisition sub-module for obtaining the initialization angle from the point cloud database; and a target navigation position designating sub-module for designating the initialization angle as the target navigation position for the camera.

In one embodiment, the screenshot data acquisition module (303) includes: a product model adjustment sub-module for adjusting the product model of the object to be identified based on the target navigation position; and a screenshot data acquisition sub-module for obtaining the data associated with the screenshot of the adjusted product model.

In one embodiment, the navigation guide generation module (304) includes: an edge data extraction sub-module for extracting edge data from the data associated with the screenshot; a screenshot data adjustment sub-module for adjusting edge color and background color of the data associated with the screenshot based on the edge data; a profile diagram extraction sub-module for extracting a profile diagram of the object to be identified based on the adjusted data associated with the screenshot; and a navigation guide designating sub-module for designating the profile diagram as the navigation guide for the object to be identified.

In one embodiment, the navigation guide generation module (304) further includes a data processing sub-module for performing frequency filtering and color correction on the edge data.

In one embodiment, the apparatus further includes a service page loading module for loading a pre-configured service page upon activating an AR application, where the service page includes the navigation guide for the object to be identified; and a video data acquisition module for controlling the movement of the camera to scan the object to be identified to obtain video data.

In one embodiment, the video data includes imagery data. The apparatus further includes a content material data obtaining module for obtaining content material data from a content material library when a user aligns the camera onto the object to be identified based on the navigation guide; a three-dimensional matrix acquisition module for matching the imagery data in the video data with the point cloud database to obtain a three-dimensional matrix; and an object presentation module for interacting the content material data and the imagery data in relation to the product model based on the three-dimensional matrix to present the object to be identified to the user, where the content material data includes one or more of: animation data, textural data, and other annotation data.

Figure 8:
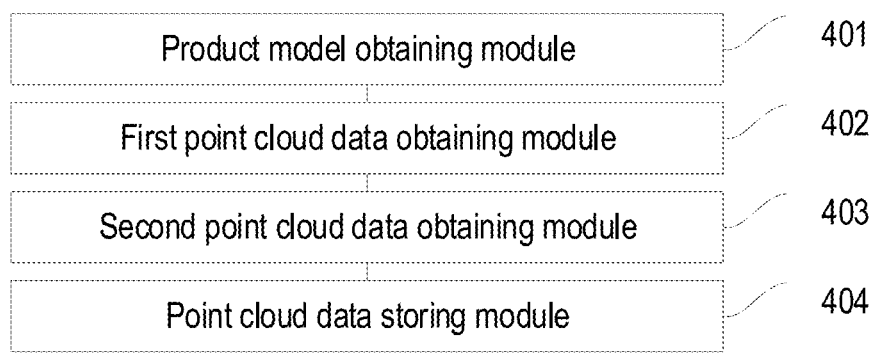
FIG. 8 is a block diagram illustrating an apparatus for generating a point cloud database according to some embodiments of the disclosure.

FIG. 8 is block diagram illustrating an apparatus for generating a point cloud database according to an embodiment of the disclosure. As shown herein, the apparatus includes a product model obtaining module (401), a first point cloud data obtaining module (402), a second point cloud data obtaining module (403), point cloud data storing module (404).

The product model obtaining module (401) is configured for obtaining a product model of an object for identifying.

The first point cloud data obtaining module (402) is configured for recording the product model at an initialization angle to obtain the point cloud data associated with the initialization angle.

The second point cloud data obtaining module (403) is configured for recording the product model at a plurality of recording angles to obtain the point cloud data associated with the plurality of recording angles.

The point cloud data storing module (404) is configured for storing, into the point cloud database, the initialization angle and the point cloud data associated with the initialization angle, as well as the plurality of recording angles and the point cloud data associated with the plurality of recording angles.

As the apparatus embodiments are substantially similar to the above-described method embodiments, details in description are not repeated herein, and reference can be made to the description of the method embodiments.

Figure 9:
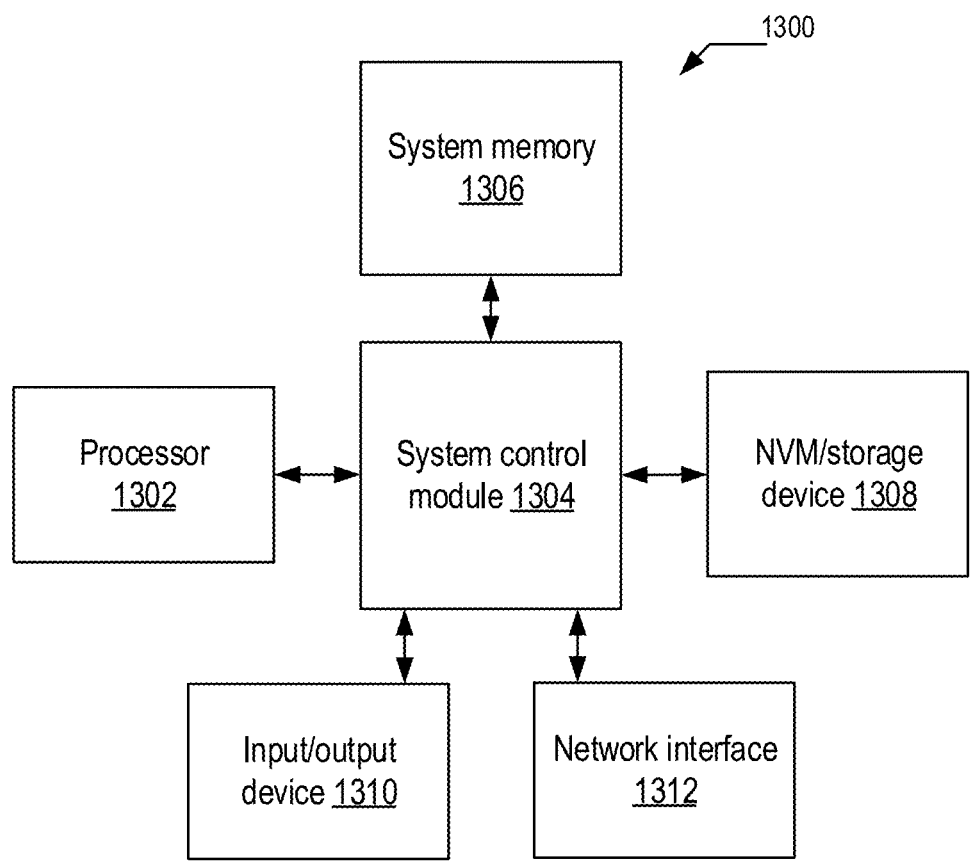
FIG. 9 is a block diagram illustrating a system for generating a navigation guide according to some embodiments of the disclosure.

Embodiments of the disclosure can be implemented as a system that uses any suitable hardware, firmware, or software, or any combination thereof to perform desired configuration and functionalities. FIG. 9 is a block diagram illustrating an exemplary system (or apparatus) (1300) for implementing various embodiments of the disclosure.

As shown in FIG. 9, the system (1300) includes one or more processors (1302); at least one system control module (chip set) (1304) coupled to the processor(s) (1302); a system memory (1306) coupled to the system control module (1304); a non-volatile memory (NVM)/storage device (1308) coupled to the system control module (1304); one or more input/output devices (1310) coupled to the system control module (1304); and a network interface (1312) coupled to the system control module (1306).

The processors (1302) includes one or more single-core or multi-core processors. The processors (1302) may include any combination of general purpose processors or special purpose processors (for example, graphics processors, application processors, or baseband processors). In some embodiments, the system (1300) is used as a data platform as described herein.

In some embodiments, the system (1300) includes one or more computer-readable media (for example, the system memory (1306) or NVM/storage device (1308)) having instructions stored thereon. The one or more processors (1302) are coupled to the one or more computer-readable media and configured to execute the instructions to perform methods as above-described.

In one embodiment, the system control module (1304) includes any suitable interface controller to provide any suitable interface to at least one of the processor(s) (1302) and/or to any suitable device or component in communication with the system control module (1304).

In one embodiment, the system control module (1304) includes a memory controller module to provide an interface to the system memory (1306). The memory controller module may be a hardware module, a software module, and/or a firmware module.

The system memory (1306) is used to load and store data and/or instructions, for example, for the system (1300). For one embodiment, the system memory (1306) includes any suitable volatile memory, such as a suitable DRAM. In some embodiments, the system memory (1306) includes a double data rate type four synchronous dynamic random-access memory (DDR SDRAM).

In one embodiment, the system control module (1304) includes one or more input/output controllers to provide an interface to the NVM/storage device (1308) and the input/output device(s) (1310).

For example, the NVM/storage device (1308) may be used to store data and/or instructions. The NVM/storage device (1308) may include any suitable non-volatile memory (for example, a flash memory) and/or may include any suitable non-volatile storage device(s) (for example, one or more hard disk drives (HDDs), one or more compact disc (CD) drives, and/or one or more digital versatile disc (DVD) drives).

The NVM/storage device (130)8 includes a storage resource that physically forms a part of a device on which the system (1300) is installed; or it may be accessible by the device and not necessarily being a part of the device. For example, the NVM/storage device (1308) may be accessed over a network via the input/output device(s) (1310).

The input/output device(s) (1310) provides an interface for the system (1300) to communicate with any other suitable device. The input/output devices (1310) includes a communication component, an audio component, a sensor component, and the like. The network interface (1312) provides an interface for the system (1300) to communicate through one or a plurality of networks. The system (1300) may wirelessly communicate with one or a plurality of components of a wireless network in accordance with any of one or a plurality of wireless network standards and/or protocols. such as accessing a wireless network based on a communication standard like WiFi, 2G, or 3G or a combination thereof to perform wireless communication.

In one embodiment, at least one of the processor(s) (1302) is packaged together with logic of one or a plurality of controllers (for example, the memory controller module) of the system control module (1304). In one embodiment, at least one of the processor(s) (1302) is packaged together with logic of one or a plurality of controllers of the system control module (1304) to form a System in Package (SiP). In one embodiment, at least one of the processor(s) (1302) is integrated on the same die with logic of one or a plurality of controllers of the system control module (1304). In one embodiment, at least one of the processor(s) (1302) is integrated on the same die with logic of one or a plurality of controllers of the system control module (1304) to form a System on Chip (SoC).

In various embodiments, the system (1300) may be, but is not limited to, a browser, a workstation, a desktop computing device, or a mobile computing device (for example, a laptop computing device, a hand-held computing device, a tablet computer, or a netbook). In various embodiments, the system (1300) may have more or fewer components and/or different architectures. For example, in some embodiments, the system (1300) includes one or more of a camera, a keyboard, a liquid crystal display (LCD) screen (including a touch screen display), a non-volatile memory port, a plurality of antennas, a graphics chip, an application specific integrated circuit (ASIC), and a speaker.

If the display includes a touch panel, a display screen may be implemented as a touch screen display to receive input signals from a user. The touch panel includes one or more touch sensors to sense touches, swipes, and gestures on the touch panel. The touch sensors may not only sense a boundary of a touch or swipe action, but also detect a period of time and a pressure related to the touch or swipe operation.

In one embodiment, the disclosure further provides a non-volatile readable storage medium in which one or more modules (programs) is/are stored. When the one or more modules is/are applied to a device, the device is configured to execute instructions in various steps of the methods described above herein.

In one example, the disclosure provides an apparatus including: one or more processors; and one or more computer-readable media having instructions stored thereon, when executed by the one or more processors, the instructions causes the apparatus to execute instructions in various steps of the methods described above herein.

Various embodiments of the disclosure are described in a progressive way, each embodiment focuses on the differences one has from others; and for the same or similar parts between various embodiments, reference may be made to the description of other embodiments.

Those skilled in the art should note that embodiments of the disclosure may be provided as a method, an apparatus, or a computer program product. Therefore, an embodiment of the disclosure may use forms of a full hardware embodiment, a full software embodiment, or an embodiment combining software and hardware aspects. Moreover, an embodiment of the disclosure may employ the format of a computer program product implemented on one or more computer usable storage media (including, but not limited to, a magnetic disk memory, a CD-ROM, an optical memory, and so on) containing computer usable program code therein.

In a typical configuration, the computer device includes one or more processors (CPUs), input/output interfaces, network interfaces, and memories. The memory may include computer-readable medium in the form of non-permanent memory, random access memory (RAM) and/or non-volatile memory or the like, such as read-only memory (ROM) or flash memory (flash RAM). The memory is an example of a computer-readable medium. The computer-readable medium includes permanent and non-permanent, movable and non-movable media that can achieve information storage by means of any methods or techniques. The information may be computer-readable instructions, data structures, modules of programs or other data. Examples of the computer storage medium include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include transitory computer readable media (transitory media), such as modulated data signals and carrier waves.

The embodiments of the disclosure are described with reference to flow charts and/or block diagrams according to the method, terminal device (system) and computer program product according to the embodiments of the disclosure. It should be understood that each procedure and/or block in the flowcharts and/or block diagrams, and a combination of procedures and/or blocks in the flowcharts and/or block diagrams may be implemented with computer program instructions. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer-readable memory that can direct a computer or another programmable data processing terminal device to operate in a particular manner, such that the instructions stored in the computer-readable memory produce an article of manufacture including instruction means, the instruction means implementing the functions specified in one or more flows of the flowcharts and/or one or more blocks of the block diagrams.

These computer program instructions may also be loaded onto a computer or another programmable data processing terminal device such that a series of operational steps are performed on the computer or another programmable terminal device to produce a computer-implemented processing, and thus the instructions executed on the computer or another programmable terminal device provide the steps for implementing the functions specified in one or more flows of the flowcharts and/or one or more blocks of the block diagrams.

Preferred embodiments of the embodiments of the disclosure have been described; however, once knowing basic creative concepts, those skilled in the art can make other variations and modifications on these embodiments. Therefore, the appended claims are intended to be interpreted as including the preferred embodiments and all variations and modifications falling within the scope of the embodiments of the disclosure.

Finally, it should be further noted that in this text, the relation terms such as first and second are merely used to distinguish one entity or operation from another entity or operation, and do not require or imply that the entities or operations have this actual relation or order. Moreover, the terms "include," "comprise" or other variations thereof are intended to cover non-exclusive inclusion, so that a process, a method, an article or a terminal device including a series of elements not only includes the elements, but also includes other elements not clearly listed, or further includes inherent elements of the process, method, article or terminal device. In a case without any more limitations, an element defined by "including a/an . . . " does not exclude that the process, method, article or terminal device including the element further has other identical elements.

A method and an apparatus for generating a navigation guide provided in the disclosure are introduced above in details. The principles and implementation manners of the disclosure are set forth herein with reference to specific examples. Descriptions of the above embodiments are merely served to assist in understanding the method and the essential ideas of the disclosure. Those of ordinary skill in the art may make changes to specific implementation manners and application scopes according to the ideas of the disclosure. In view of the above, the content of the description should not be construed as limiting the disclosure.

The invention claimed is:

1. A method comprising:
   obtaining, by a mobile device, a point cloud database corresponding to an object to be identified, the object having a respective product model;
   determining, by the mobile device, a target navigation position based at least in part on the point cloud database;
   obtaining, by the mobile device, data associated with a screenshot of the product model, the screenshot captured when the mobile device is positioned in the target navigation position; and
   generating a navigation guide for the object based at least in part on the data associated with the screenshot.

2. The method of claim 1, the determining the target navigation position of the object to be identified comprising:
   obtaining an initialization angle from the point cloud database; and
   designating the initialization angle as the target navigation position for a camera of the mobile device.

3. The method of claim 1, the obtaining data associated with the screenshot of the product model comprising:
   adjusting the product model of the object to be identified based on the target navigation position; and
   obtaining the data associated with the screenshot of the adjusted product model.

4. The method of claim 1, the generating the navigation guide for the object based on the data associated with the screenshot comprising:
   extracting edge data from the data associated with the screenshot;
   adjusting, based on the edge data, one or more of an edge color and background color of the data associated with the screenshot;
   extracting a profile diagram of the object to be identified based on the data associated with the adjusted screenshot; and
   designating the profile diagram as the navigation guide for the object to be identified.

5. The method of claim 4, further comprising performing, on the edge data, one or more of a frequency filtering and color correction after the extracting edge data from the data associated with the screenshot.

6. The method of claim 1, further comprising:
   loading a pre-configured service page when activating an augmented reality (AR) application after the generating the navigation guide for the object based on the data associated with the screenshot, the service page comprising the navigation guide for the object to be identified; and controlling movement of a camera to scan the object to be identified to obtain video data.

7. The method of claim 6, further comprising:

obtaining, after the controlling the movement of the camera to scan the object to be identified to obtain the video data, content material data from a content material library when a user aligns the camera at the object to be identified based on the navigation guide;

matching imagery data in the video data with the point cloud database to obtain a three-dimensional (3D) matrix; and interacting, based on the 3D matrix, the content material data and the imagery data in relation to the product model to present the object to be identified to the user, the content material data comprising one or more of: animation data, texture data, and other annotation data.

8. A non-transitory computer-readable storage medium for tangibly storing computer program instructions capable of being executed by a computer processor of a mobile device, the computer program instructions defining the steps of:

obtaining a point cloud database corresponding to an object to be identified, the object having a respective product model;

determining a target navigation position based at least in part on the point cloud database;

obtaining data associated with a screenshot of the product model, the screenshot captured when the mobile device is positioned in the target navigation position; and generating a navigation guide for the object based at least in part on the data associated with the screenshot.

9. The computer-readable storage medium of claim 8, the determining the target navigation position of the object to be identified comprising:

obtaining an initialization angle from the point cloud database; and designating the initialization angle as the target navigation position for a camera of the mobile device.

10. The computer-readable storage medium of claim 8, the obtaining data associated with the screenshot of the product model comprising:

adjusting the product model of the object to be identified based on the target navigation position; and obtaining the data associated with the screenshot of the adjusted product model.

11. The computer-readable storage medium of claim 8, the generating the navigation guide for the object based on the data associated with the screenshot comprising:

extracting edge data from the data associated with the screenshot;

adjusting, based on the edge data, one or more of an edge color and background color of the data associated with the screenshot;

extracting a profile diagram of the object to be identified based on the data associated with the adjusted screenshot; and designating the profile diagram as the navigation guide for the object to be identified.

12. The computer-readable storage medium of claim 11, further comprising performing, on the edge data, one or more of a frequency filtering and color correction after the extracting edge data from the data associated with the screenshot.

13. The computer-readable storage medium of claim 8, further comprising:

loading a pre-configured service page when activating an augmented reality (AR) application after the generating the navigation guide for the object based on the data associated with the screenshot, the service page comprising the navigation guide for the object to be identified; and controlling movement of a camera to scan the object to be identified to obtain video data.

14. The computer-readable storage medium of claim 13, further comprising:

obtaining, after the controlling the movement of the camera to scan the object to be identified to obtain the video data, content material data from a content material library when a user aligns the camera at the object to be identified based on the navigation guide;

matching imagery data in the video data with the point cloud database to obtain a three-dimensional (3D) matrix; and interacting, based on the 3D matrix, the content material data and the imagery data in relation to the product model to present the object to be identified to the user, the content material data comprising one or more of: animation data, texture data, and other annotation data.

15. An apparatus comprising:

a processor; and a storage medium for tangibly storing thereon program logic for execution by the processor, the stored program logic causing the processor to perform the operations of:

obtaining a point cloud database corresponding to an object to be identified, the object having a respective product model;

determining a target navigation position based at least in part on the point cloud database;

obtaining data associated with a screenshot of the product model, the screenshot captured when the apparatus is positioned in the target navigation position; and generating a navigation guide for the object based at least in part on the data associated with the screenshot.

16. The apparatus of claim 15, the determining the target navigation position of the object to be identified comprising:

obtaining an initialization angle from the point cloud database; and designating the initialization angle as the target navigation position for a camera of the apparatus.

17. The apparatus of claim 15, the obtaining data associated with the screenshot of the product model comprising:

adjusting the product model of the object to be identified based on the target navigation position; and obtaining the data associated with the screenshot of the adjusted product model.

18. The apparatus of claim 15, the generating the navigation guide for the object based on the data associated with the screenshot comprising:

extracting edge data from the data associated with the screenshot;

adjusting, based on the edge data, one or more of an edge color and background color of the data associated with the screenshot;

extracting a profile diagram of the object to be identified based on the data associated with the adjusted screenshot; and designating the profile diagram as the navigation guide for the object to be identified.

19. The apparatus of claim 18, the operations further comprising performing, on the edge data, one or more of a frequency filtering and color correction after the extracting edge data from the data associated with the screenshot.

20. The apparatus of claim 15, the operations further comprising:
  loading a pre-configured service page when activating an augmented reality (AR) application after the generating the navigation guide for the object based on the data associated with the screenshot, the service page comprising the navigation guide for the object to be identified; and
  controlling movement of a camera to scan the object to be identified to obtain video data.

* * * * *